(12) United States Patent
Moon

(10) Patent No.: US 6,543,901 B2
(45) Date of Patent: Apr. 8, 2003

(54) REFLECTIVE DISPLAY DEVICE

(75) Inventor: Jeong Min Moon, Ansan (KR)

(73) Assignee: LG Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/754,373

(22) Filed: Jan. 5, 2001

(65) Prior Publication Data

US 2001/0028505 A1 Oct. 11, 2001

(30) Foreign Application Priority Data

Jan. 7, 2000 (KR) .......................................... 2000-638

(51) Int. Cl.[7] .............................................. G02B 27/00
(52) U.S. Cl. ....................... 359/613; 359/614; 359/615; 359/36; 359/48; 359/49
(58) Field of Search ................................ 359/613, 614, 359/615, 36, 48, 49, 69, 70, 71; 362/31, 32, 326, 328

(56) References Cited

U.S. PATENT DOCUMENTS 4,357,074 A * 11/1982 Nardini ....................... 350/259
5,341,231 A 8/1994 Yamamoto et al.
5,477,239 A 12/1995 Busch et al.
6,068,382 A * 5/2000 Fukui et al. .................. 362/31

* cited by examiner

Primary Examiner—Mohammad Sikder
(74) Attorney, Agent, or Firm—Birch, Stewart, Kolasch & Birch, LLP

(57) ABSTRACT

A reflective display device that is capable of improving a light efficiency in a reflective liquid crystal display in which a light is obliquely inputted from a peripheral light source or an auxiliary light source. In the device, an optical medium is provided with an inclined surface for refracting an incident light and refracting a light reflected from a reflective display part such that an obliquely inputted external light is vertically incident, to the reflective display part. Accordingly, it becomes possible to maximize a light efficiency of the reflective liquid crystal display at which a light is obliquely inputted from the peripheral light source or the auxiliary light source.

11 Claims, 12 Drawing Sheets

REFLECTIVE DISPLAY DEVICE

BACKGROUND OF THE INVENTION

1. Field of the Invention

This invention relates to a reflective display device, and more particularly to a reflective display device that is capable of improving a light efficiency in a reflective liquid crystal display in which a light is obliquely inputted from a peripheral light source or an auxiliary light source.

2. Description of the Related Art

A liquid crystal display (LCD) is a flat panel display device having advantages of small bulk, thin thickness and low power consumption. The LCD has been used as a portable computer such as a notebook personal computer, an office automation equipment and an audio/video machinery, etc. The LCD controls an electric field applied to a liquid crystal material having a dielectric anisotrophy to transmit or shut off a light, thereby displaying a picture or an image. The LCD exploits an external light rather than generating a light by himself unlike display devices such as an electro-luminescence (EL) device, a cathode ray tube (CRT), a light emitting diode (LED) and so on.

The LCD is largely classified into a transmissive type and a reflective type depending on a method of exploiting a light. The transmissive LCD includes a liquid crystal panel having a liquid crystal material injected between two glass substrates, and a back light for supplying a light to the liquid crystal panel. However, the transmissive LCD has not only a difficulty in making a product with a thin thickness and a light weight, but also it has a drawback in which the back light has an excessive power consumption. On the other hand, the reflective LCD includes a reflective liquid crystal display panel 10 that transmit and reflect a natural light and a peripheral light to and from the display screen without a back light as shown in FIG. 1. The reflective liquid crystal panel 10 consists of a liquid crystal panel 2 in which a liquid crystal material is injected between two glass substrates, and a reflector 4 arranged at the rear side of the liquid crystal panel 2 or arranged at the interior of the liquid crystal panel to reflect a light toward the display screen. This reflective LCD does not use the back light, but reflects a natural light or a peripheral light by means of the reflector 4 so as to display a picture or an image. However, since the reflective LCD has a considerably low brightness level at a place where a natural light or a peripheral light is not sufficient, it does not permit an observer to view the displayed image. In order to solve this problem, there has been suggested a reflective LCD exploiting an auxiliary light other than a natural light.

FIG. 2 shows a conventional reflective LCD disclosed in U.S. Pat. No. 5,477,239. Referring to FIG. 2, the conventional reflective LCD includes a display module 24 installed pivotally at a main body 28 and mounted with a reflective liquid crystal panel 22, and auxiliary light sources 26a and 26b of a line light source type installed at the left and right sides of the reflective liquid crystal panel 22, respectively. Each auxiliary light source 26a and 26b is installed on the display module 24 such that they can be opened and closed, and irradiates a light onto the reflective liquid crystal display panel 22 in a state of being exposed to the exterior of the display module 24. As seen from FIG. 3, a film 30 is attached onto an upper glass substrate of the reflective liquid crystal display panel 22. As shown in FIG. 4, this film 30 is provided with a plurality of minute protrusion patterns 30a for turning a light inputted from the auxiliary light sources 26a and 26b into the display screen of the reflective liquid crystal panel 22.

However, in the reflective LCD shown in FIG. 2, since the auxiliary light sources 26a and 26b have to be installed within the display module 24, an effective display area of the reflective liquid crystal display panel 22 is relatively reduced to that extent. To enlarge the effective display area raises a problem of a dimension increase of the display module 24. Also, the reflective LCD has a problem in that an light incidence efficiency becomes low due to a light-intensity difference of a light being incident to the reflective liquid crystal display panel 22 in accordance with a distance difference from the auxiliary light sources 26a and 26b. Furthermore, the conventional reflective LCD has a drawback in that, since the minute protrusion patterns 30a of the film 30 must have different inclination angle and height for each location thereof so that a light can be uniformly incident to the display screen of the reflective liquid crystal display panel 22, they have a difficulty in their design and manufacturing. Also, since the film 30 has plane parts existing between the minute protrusion patterns 30a so that it make no effect to an external peripheral light other than the auxiliary light sources 26a and 26b, it can reflect only a light inputted at a very large incline from the auxiliary light sources 26a and 26b into the reflective liquid crystal display panel 22.

FIG. 5 shows a conventional reflective LCD disclosed in U.S. Pat. No. 5,341,231. Referring to FIG. 5, the conventional reflective LCD includes a light guide 34 applied to the front surface of a reflective liquid crystal display panel 32, and lamps 38a and 38b installed at each side of the light guide 34. The rear side of the light guide 34 applied to the front surface of the reflective liquid crystal display panel 32 is provided with minute protrusion patterns 34a. The minute protrusion patterns 34a refracts a light inputted obliquely via lamps 38a and 38b and a collimator (36a, 36b) in a direction perpendicular to the reflective liquid crystal display panel 32. As a light outputted from the light guide 34 is inputted as perpendicularly as possible to the reflective liquid display panel 32, a reflection from the surface of the liquid crystal display panel 32 is more reduced and a picture brightness is more increased. However, an inclined-direction component of a light outputted from the light guide 34 as shown in FIG. 5 becomes larger than a vertical-direction component thereof as seen from FIG. 6. Thus, a light intensity being incident to the reflective liquid crystal panel 32 from the light guide to make a direct contribution to a brightness of the reflective liquid crystal display panel is only a portion of total light intensity.

SUMMARY OF THE INVENTION

Accordingly, it is an object of the present invention to provide a reflective display device that is capable of improving a light efficiency in a reflective liquid crystal display in which a light is obliquely inputted from a peripheral light source or an auxiliary light source.

In order to achieve these and other objects of the invention, a reflective display device according to an embodiment of the present invention includes reflective display means for displaying an image; and an optical medium having an inclined surface for refracting an incident light and refracting a light reflected from the reflective display means such that an obliquely inputted external light is vertically incident to the reflective display means.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 7:
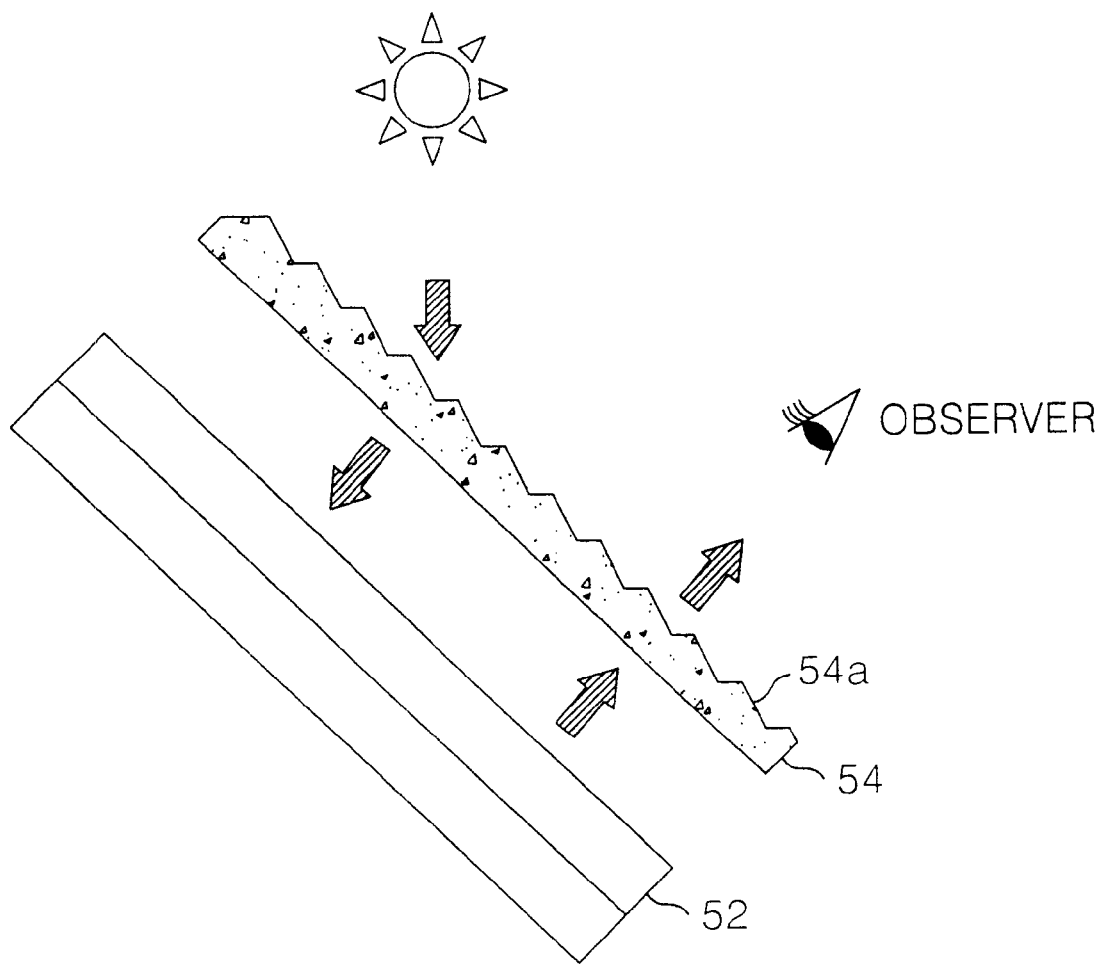
FIG. 7 is a section view showing a structure of a reflective liquid crystal display panel according to a first embodiment of the present invention.

Referring to FIG. 7, there is shown a reflective liquid crystal display (LCD) according to a first embodiment of the present invention. The reflective LCD includes a light-refracting film 54 installed in such a manner to be opposed to the front side of a reflective liquid crystal display panel 52.

The light-refracting film 54 plays a role to refract a light inputted from a peripheral light source in a direction perpendicular to the reflective liquid crystal panel 52 and refract a light reflected from the reflective liquid crystal display panel 52 toward an observer. To this end, the bottom surface of the light-refracting film 54 has a plane parallel to the display screen of the reflective liquid crystal display panel 52, and the upper surface thereof is provided with minute protrusion patterns 54a for determining a refraction angle of a light. A detailed explanation as to such a light-refracting film 54 will be described later.

Figure 8:
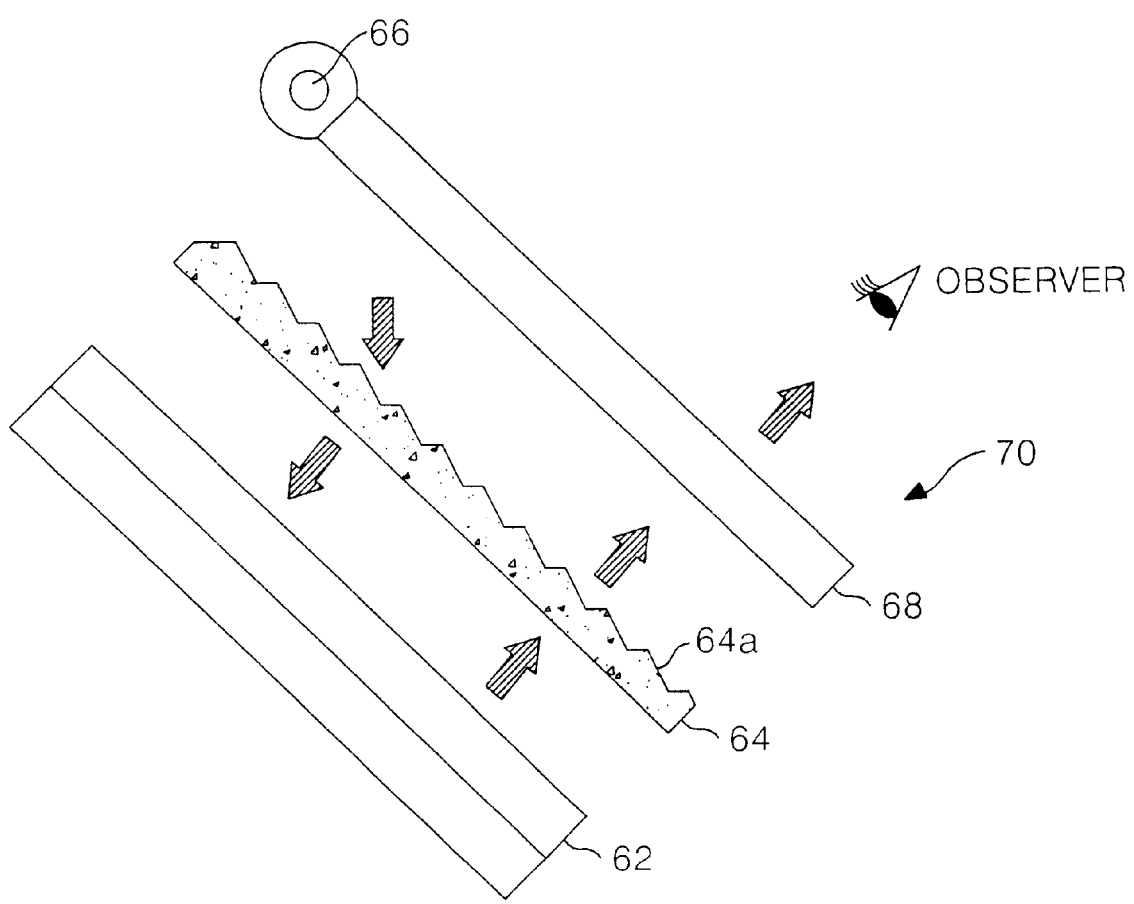
FIG. 8 is a section view showing a structure of a reflective liquid crystal display panel according to a second embodiment of the present invention.

Referring to FIG. 8, there is shown a reflective liquid crystal display (LCD) according to a second embodiment of the present invention. The reflective LCD includes an auxiliary surface light source 70 for irradiating a light onto a reflective liquid crystal display panel 62, and a light-refracting film 64 installed between the reflective liquid crystal display panel 62 and the auxiliary surface light source 70.

The auxiliary surface light source 70 includes a lamp 66 and a light guide 68 so as to convert a light generated from the lamp 66 into a surface light shape using the light guide 68 and irradiate it onto the light-refracting film 64. The light-refracting film 64 plays a role to refract a light inputted from the light guide 68 in a direction perpendicular to the reflective liquid crystal display panel 62 and refract a light reflected from the reflective liquid crystal display panel 62 toward an observer. To this end, the bottom surface of the light-refracting film 64 has a plane parallel to the display screen of the reflective liquid crystal display panel 62, and the upper surface thereof is provided with minute protrusion patterns 64a for determining a refraction angle of a light. A detailed explanation as to such a light-refracting film 64 will be described later.

Figure 9:
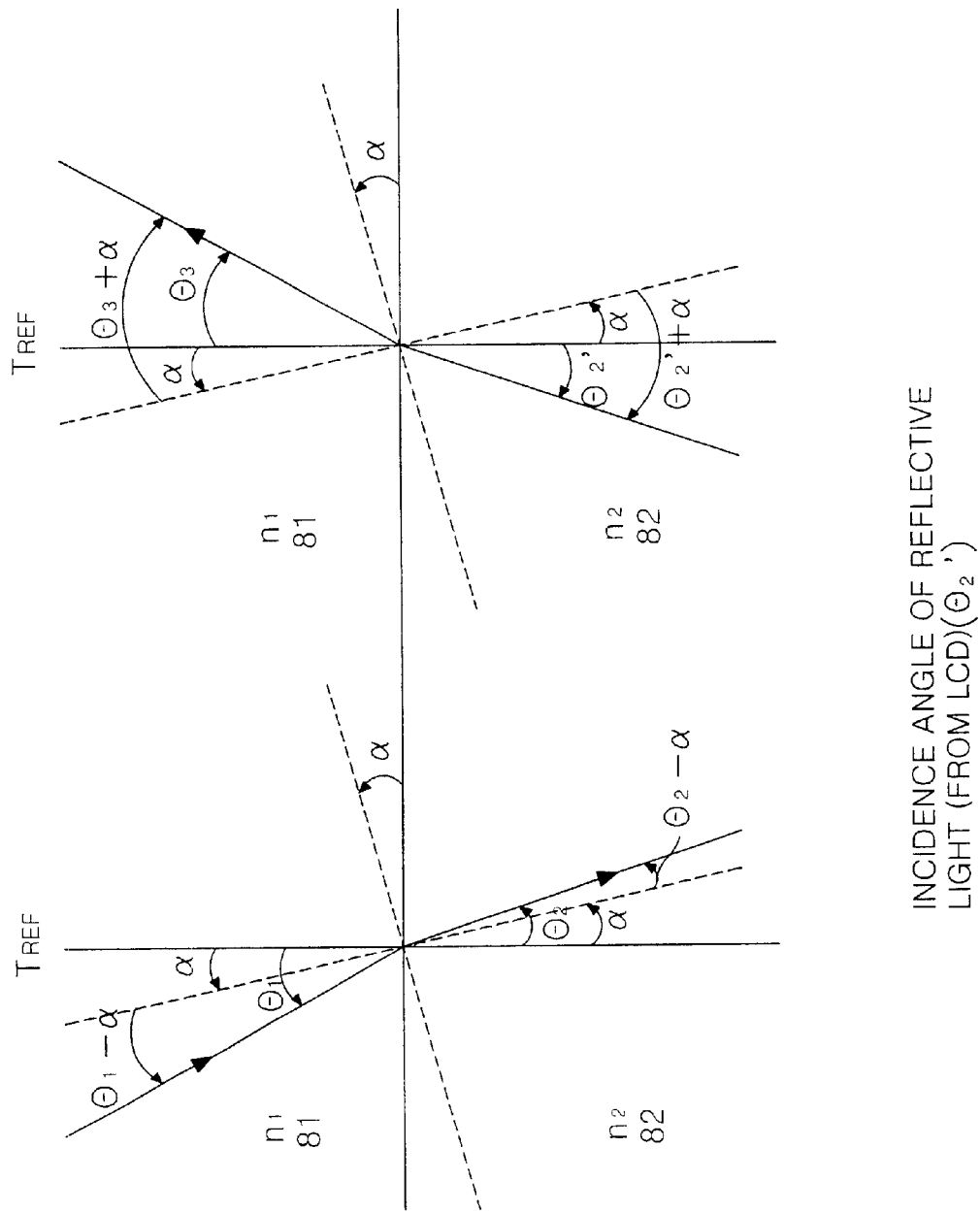
FIG. 9 represents an angle change of a transmitted light and a reflective light according to a variation in an inclination angle of the boundary surface of two media having a different refractive index for the sake of designing the optical media shown in FIG. 7 and FIG. 8.

Referring to FIG. 9, when a light is incident to the boundary surface of two media 81 and 82 having a different refractive index, then the incident light is progressed after being refracted on an boundary surface. If an incidence angle of the incident light is fixed, then a refraction angle of a light transmitting the second medium 82 becomes different when a slope angle of the boundary surface between the two media 81 and 82 changes. Accordingly, if a slope of the boundary surface between the two media 81 and 82 is appropriately selected, then a light being inputted at a desired slope from a peripheral light source or an auxiliary light source can be refracted in a direction perpendicular to the display screens of the reflective liquid crystal display panels 52 and 62.

A refraction of an incident light can be calculated from Snell's law as defined by the following equation:

$$n_1 \sin(\theta_1 - \alpha) = n_2 \sin(\theta_2 - \alpha) \quad (1)$$

wherein $n_1$ and $n_2$ represent a refractive index of the first and second media 81 and 82, respectively; $\alpha$ is an inclination angle of the boundary surface having an angle at which the boundary surface makes with respect to a plane parallel to the display screens of the reflective liquid crystal display panels 52 and 62; and $\theta_1$ and $\theta_2$ represent an angle at which an incident light and a transmitted light progressing in the second medium 82 make with respect to a normal line $T_{REF}$ perpendicular to the display screens of the reflective liquid crystal display panel 52 and 62, respectively.

Accordingly, the inclination angle $\alpha$ of the boundary surface between the media 81 and 82 capable of refracting an incident light inputted at a certain inclination angle perpendicularly to the display screens of the reflective liquid crystal display panels 52 and 62 can be obtained by the following equation:

$$\alpha = \tan^{-1}\{(n_1 \sin \theta_1 - n_2 \sin \theta_2)/(n_1 \cos \theta_1 - n_2 \cos \theta_2)\} \quad (2)$$

Figure 10:
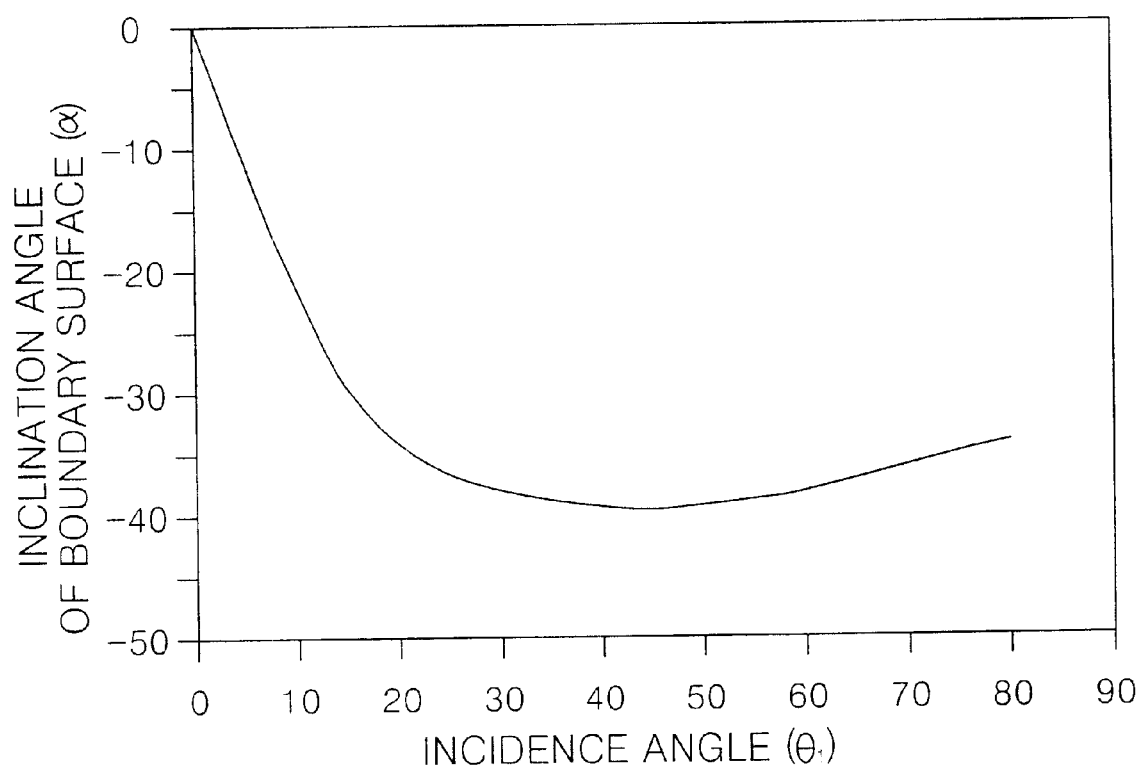
FIG. 10 is a characteristic graph representing an inclination angle of the boundary surface for vertically refracting an obliquely inputted light when a refractive index of the first medium in FIG. 9 is 1.0 and a refractive index of the second medium in FIG. 9 is 1.49.

FIG. 10 is a graph representing an inclination angle α of the boundary surface for refracting an inclined incident light in the vertical direction when a refractive index $n_1$ of the first medium 81 is 1.0 and a refractive index $n_2$ of the second medium 82 is 1.49. In FIG. 10, the horizontal axis represents an incidence angle $\theta_1$ changing from 0° until 90° at an interval of 10°, and the vertical axis represents an inclination angle α of the boundary surface for refracting an incident light in the vertical direction in accordance with a change in the incidence angle $\theta_1$ at an interval of 10° from −50° until 0°. In particular, 30° is an angle at which a main light of the peripheral light source is incident to the display screen of the reflective display device when an observer views the display screen of the reflective display device in the vertical direction. As can be seen from FIG. 10, if the boundary surface is inclined at about 39° in the clockwise direction with respect to an incident light having an inclination angle of 30°, then the incident light is refracted in a direction perpendicular to the display screen of the liquid crystal display panel 52 or 62 upon passing through the boundary surface of the two media 81 and 82.

An refraction angle $\theta_2$ of a transmitted light progressing the second medium 82 against the display screen of the reflective liquid crystal display panel 52 or 62 in accordance with an inclined incidence angle on the boundary surface having a certain inclination angle α can be calculated by the above equation (1). The refraction angle $\theta_2$ of a transmitted light progressing the second medium 82 is as follows:

$$\theta_2 = \alpha + \sin^{-1}[(n_1 \sin(\theta_1 - \alpha))/n_2] \quad (3)$$

Figure 11:
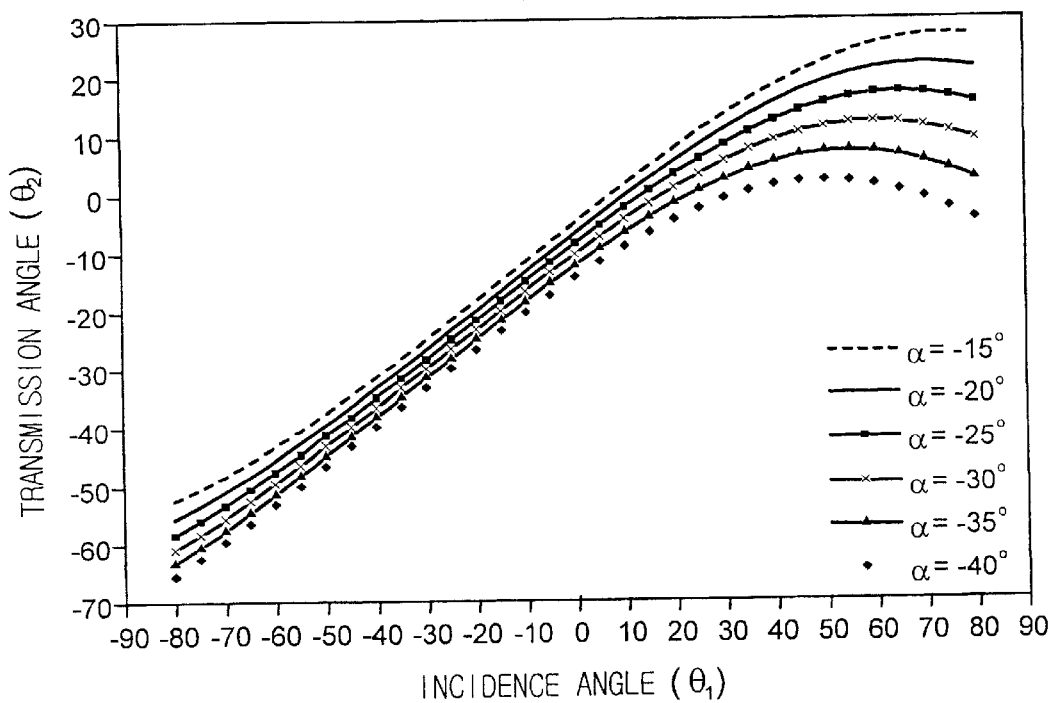
FIG. 11 is a characteristic graph representing a relationship of an transmission angle to an incidence angle when a refractive index of the first medium in FIG. 9 is 1.0, a refractive index of the second medium in FIG. 9 is 1.49, and an inclination angle of the boundary surface has a range of −15° to −40°.

FIG. 11 is a graph representing a transmission angle $\theta_2$ of a light transmitting the second medium 82 against an incidence angle $\theta_1$ when a refractive index $n_1$ of the first medium 81 is 1.0 and a refractive index $n_2$ of the second medium 82 is 1.49 and when an inclination angle α of the boundary surface changes at an interval of −5° from −15° until −40°. In FIG. 11, the horizontal axis represents an incidence angle $\theta_1$ changing from −90° until 90° at an interval of 10°, and the vertical axis represents a transmission angle $\theta_2$ changing in accordance with a variation in the incidence angle $\theta_1$ at an interval of 10° from −70° until 30°. It can be seen from FIG. 11 that a transmission angle $\theta_2$ of a light transmitting the second medium 82 against an inclined incidence angle $\theta_1$ having a range of 0° to 45° has a distribution between −15° to 15° when an inclination angle α on the boundary surface is −15° to −40°.

A light refracting at an angle close to a right angle in accordance with an inclination angle α of the boundary surface and transmitting the second medium 82 is reflected by a reflector of the reflective liquid crystal display panel 52 or 62. The light reflected from the reflective liquid crystal display panel 52 or 62 should be progressed within an effective visible range of an observer so as to enhance a light efficiency. In other words, since the majority of observers views the display device vertically, a light reflected from the reflective liquid crystal display panel 52 or 62 also should progress in the vertical direction to be incident to an observer's eye.

The right depiction of FIG. 9 shows a light path along which a light reflected from the reflective liquid crystal display panel 52 or 62 is refracted at the boundary surface between the media 81 and 82 while transmitting the second medium 82 and the first medium 81 sequentially to progress the first medium 81. A progressing process of such a reflective light can be expressed by the following equation based on the Snell's law:

$$n_2 \sin(\theta_2' + \alpha) = n_1 \sin(\theta_3 + \alpha) \quad (4)$$

An incidence angle of the reflective light being refracted at the boundary surface between the media 81 and 82 to transmit the first medium 81 from the above equation (4) is as follows:

$$\theta_3 = -\alpha + \sin^{-1}[(n_2 \sin(\theta_2' + \alpha))/n_1] \quad (5)$$

Figure 12:
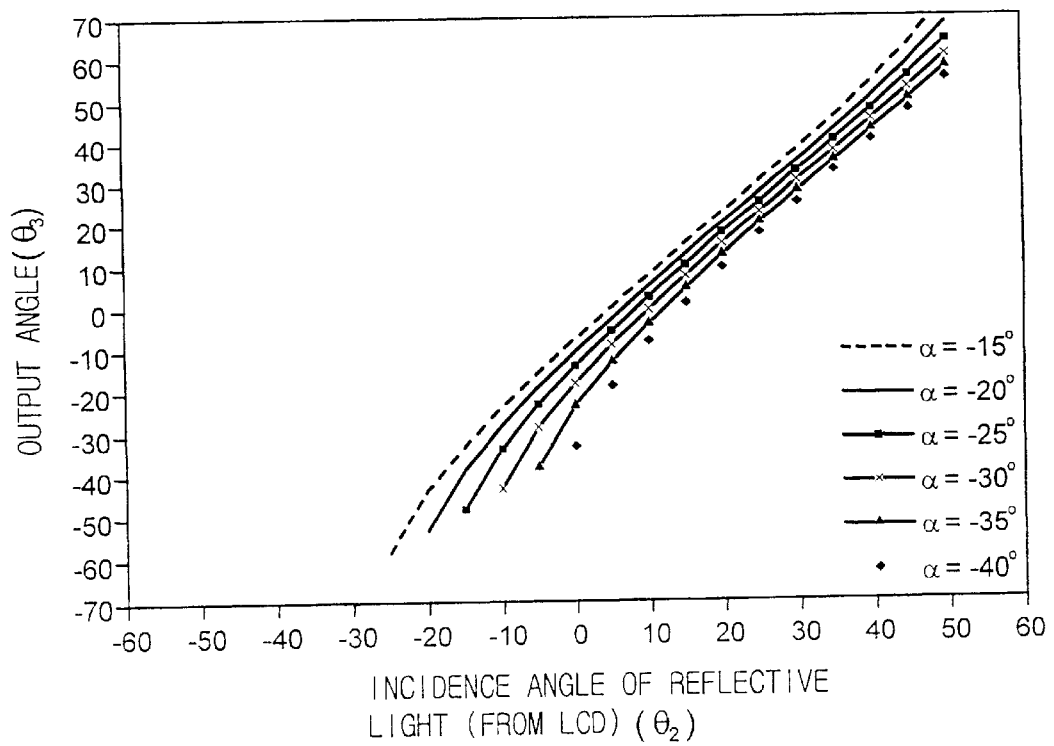
FIG. 12 is a characteristic graph representing a relationship of an output angle to a reflection angle of a reflective light reflected from the reflective liquid crystal display panel when a refractive index of the first medium in FIG. 9 is 1.0, a refractive index of the second medium in FIG. 9 is 1.49, and an inclination angle of the boundary surface has a range of −15° to −40°.

FIG. 12 is a graph representing an output angle $\theta_3$ of a light transmitting the first medium 81 against a reflection angle $\theta_2'$ when a refractive index $n_1$ of the first medium 81 is 1.0 and a refractive index $n_2$ of the second medium 82 is 1.49 and when an inclination angle α of the boundary surface changes at an interval of −5° from −15° until −40°. In FIG. 12, the horizontal axis represents a reflection angle $\theta_2'$ changing from −60° until 60° at an interval of 10°, and the vertical axis represents an output angle $\theta_3$ changing in accordance with a variation in the reflection angle $\theta_2'$ at an interval of 10° from −70° until 70°. Since a full reflection is generated at a specific range of reflection angle $\theta_2'$ to prevent a light to from being progressed toward the first medium 81, a range of the output angle $\theta_3$ at the graph in FIG. 12 becomes narrower than that in FIG. 11. It can be seen from FIG. 12 that an output light going via the first medium 81 toward an observer is within an effective observation range of the observer when an inclination angle α of the boundary surface has a range of −15° to −35°.

Figure 13:
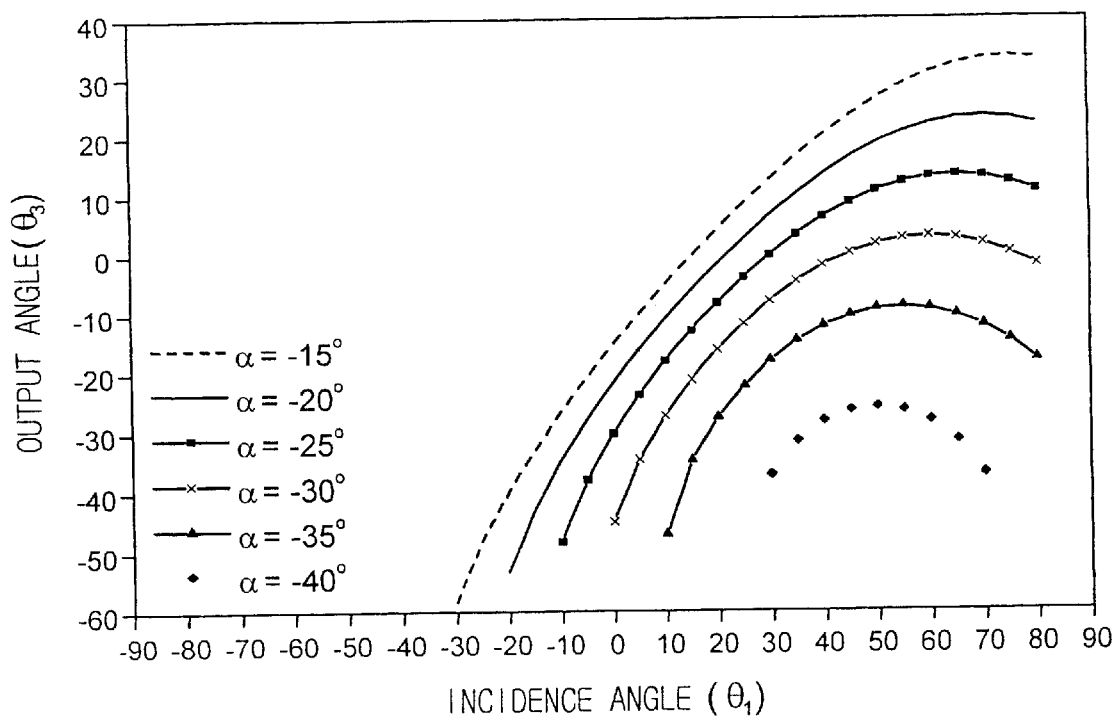
FIG. 13 is a characteristic graph representing a relationship of an output angle to an incidence angle when a refractive index of the first medium in FIG. 9 is 1.0, a refractive index of the second medium in FIG. 9 is 1.49, and an inclination angle of the boundary surface has a range of −15° to −40°.

A relationship among an incidence angle $\theta_1$, a transmission angle $\theta_2$ and an output angle $\theta_3$ described in conjunction with the equations (1) to (5) along with FIGS. 9 to 12 can be adjusted into a relationship of an output angle $\theta_3$ to an incidence angle $\theta_1$ according to an inclination angle α of the boundary surface as shown in FIG. 13. In FIG. 13, the horizontal axis represents an incidence angle $\theta_1$ changing from −90° until 90° at an interval of 10°, and the vertical axis represents an output angle $\theta_3$ changing in accordance with a variation in the incidence angle $\theta_1$ at an interval of 10° from −60° until 40°. It can be seen from FIG. 13 that, if the boundary surface between the two media 81 and 82 having a different refractive index has a specific range of inclination angle α, an inclined incident light is refracted in accordance with the inclination angle α of the boundary surface to thereby be progressed to the reflective liquid crystal display panel 52 or 62 at an angle close to a right angle and a light reflected from the reflective liquid crystal display panel 52 or 62 is progressed within an effective visible range of an observer.

In FIG. 13, an incidence angle $\theta_1$ of a light inputted from the peripheral light source or the auxiliary surface light source 70 and an output angle $\theta_3$ refracted at the boundary surface in accordance with a variation in an inclination angle α of the boundary surface between the media 81 and 82 are indicated by the following table:

TABLE 1

| Inclination Angle (α) | Incidence Angle ($\theta_1$) | Output Angle ($\theta_3$) |
|---|---|---|
| −15° | 30° | 12.5° |
|  | 40° | 20.0° |
|  | 45° | 23.3° |
| −20° | 30° | 6.4° |

TABLE 1-continued

| Inclination Angle (α) | Incidence Angle (θ₁) | Output Angle (θ₃) |
|---|---|---|
|  | 40° | 13.3° |
|  | 45° | 16.2° |
| −25° | 30° | −0.3° |
|  | 40° | 6.1° |
|  | 45° | 8.6° |
| −30° | 30° | −8.1° |
|  | 40° | −2.1° |
|  | 45° | 0.0° |
| −35° | 30° | −18.3° |
|  | 40° | −12.4° |
|  | 45° | −10.6° |
| −40° | 30° | −37.3° |
|  | 40° | −28.5° |
|  | 45° | −26.7° |

Figure 14:
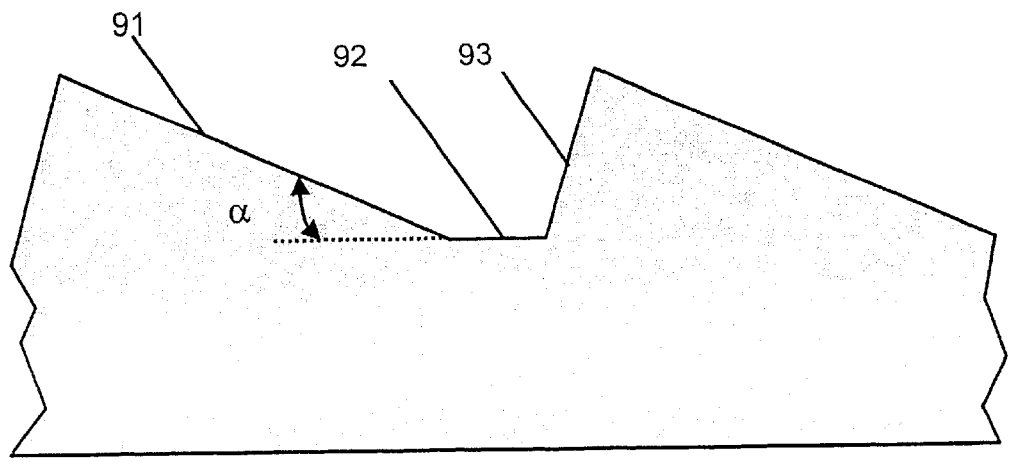
FIG. 14 is a detailed section view of an upper surface of the optical media shown in FIG. 7 and FIG. 8.

An upper surface of the light-refracting film 54 or 64 capable of maximizing a light efficiency is designed on a basis of an incidence angle $\theta_1$ and an output angle $\theta_3$ according to an inclination angle α of the boundary surface when $n_1=1.0$ and $n_2=1.49$ and when an inclination angle α of the boundary surface changes from −15° until −40° at an interval of 5°. The upper surface of the light-refracting film 54 or 64 to which a light is incident includes a first inclined face 91 and a second inclined face 93 having a different inclination angle with having a plane 92 therebetween as shown in FIG. 14. The first inclined face 91 refracts a light inputted at a certain inclination angle from the peripheral light source or the auxiliary surface light source 70 in a direction perpendicular to the bottom surface of the light-refracting film 54 or 64. The incident light refracted by the first inclined face 91 is vertically incident to the reflective liquid crystal display panel 52 or 62. A light being incident to the reflective liquid crystal display panel 52 or 62 is reflected to be incident to the light-refracting film 54 or 64 and then transmits the plane 92 and the first inclined face 91 and the second inclined face 93 existing in the upper surface of the light-refracting film 54 or 64 to be progressed toward an observer. In this case, the light transmitting the upper surface of the light-refracting film 54 or 64 transmits the plane 92 as it is at the same angle as that inputted from the lower surface of the light-refracting film 54 or 64, but it is refracted at an optimum output angle $\theta_3$ according to an inclination angle α by the first inclined face 91 to be progressed toward an observer. The second inclined face 93 plays a role to link the first inclined face 91 with the plane 92. An inclination angle α of the first inclined face 91 is determined in consideration of a refractive index of the light-refracting film 54 or 64 when an incident light is vertically incident to the reflective liquid crystal display panel 52 or 62. For instance, an inclination angle α of the first inclined face 91 can be determined to a range of 10° to 35° when a refractive index n of the light-refracting film 54 or 64 is 1.49. It is desirable that a width of the plane 92 between the first inclined face 91 and the second inclined face 93 should be smaller than that of the first inclined face 91 to have light refracted by the first inclined face 91 as much as possible. However, the plane 92 does not have a limitation in size because it allows a light reflected from the reflective liquid crystal display panel 52 or 62 to be transmitted with no refraction so as to enhance an output light efficiency.

The upper surface pattern of the light-refracting film 54 or 64 consisting of the first inclined face 91, the plane 92 and the second inclined face 93 may take a rough shape or in a wavelike line or irregular line shape such that an interference pattern generated in a state in which an electrode line pattern of the reflective liquid crystal display panel 52 or 62 is adjacent, in parallel, to the upper surface pattern thereof does not appear. Also, the generation of the interference pattern can be prevented by making a coating treatment of the surface of the upper surface pattern of the light-refracting film 54 or 64. In order to prevent the occurrence of the interference pattern, the upper surface pattern of the light-refracting film 54 or 64 consisting of the first inclined face 91, the plane 92 and the second inclined face 93 may be formed on the light-refracting film 54 or 64 in such a manner to make an angle ranged at 0° to 8° with respect to the electrode line pattern rather than being parallel thereto.

As a refractive index n of the light-refracting film 54 or 64 has a different value, an output angle $\theta_3$ against an incidence angle $\theta_1$ of an incident light becomes different in accordance with an inclination angle α of the first inclined face 91. In other words, an inclination angle α of the first inclined face 91 having an optimum output angle $\theta_3$ is designed to have a different value in accordance with the refractive index n of the light-refracting film 54 or 64. For instance, if the incidence angle $\theta_1$ is 30°, 40° or 45°, then an inclination angle α of the first inclined face 91 becomes different in accordance with an refractive index n of the light-refracting film 54 or 64 when an optimum output angle $\theta_3$ exists within a range of −15° to 15° as indicated in the following table:

TABLE 2

| Refractive Index of Light-refracting film | Inclination Angle of the First Inclined face |
|---|---|
| n = 1.3 | 30° ≦ α ≦ 40° |
| n = 1.4 | 25° ≦ α ≦ 35° |
| n = 1.5 | 25° ≦ α ≦ 30° |
| n = 1.6 | 20° ≦ α ≦ 20° |

In the table 2, the inclination angle α of the first inclined face 91 has been calculated at an interval of 5° and has a variation of ±3°. Also, the inclination angle α of the first inclined face 91 may be different in accordance with a selected range of the optimum output angle $\theta_3$.

Figure 1:
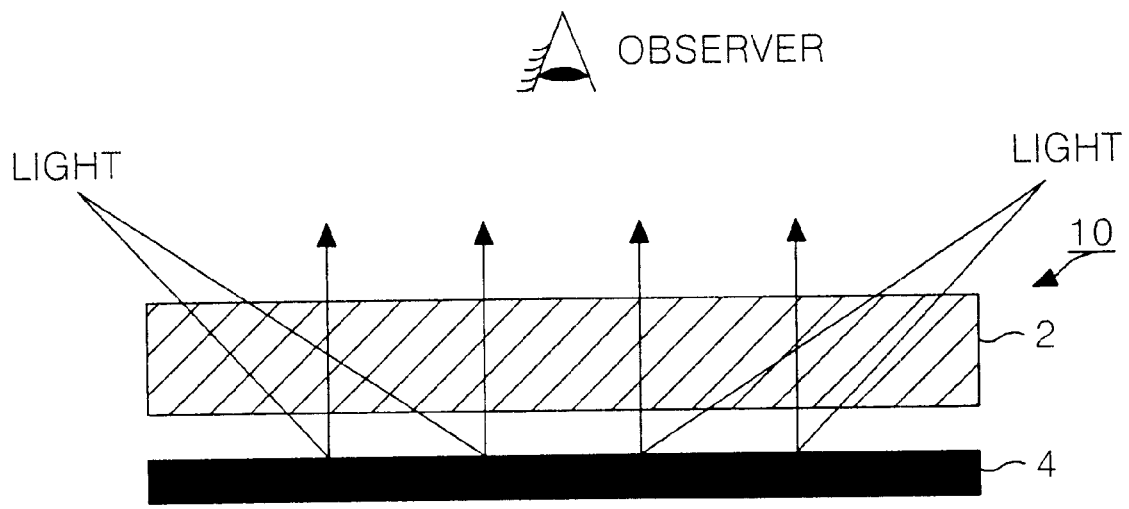
FIG. 1 is a schematic section view showing a structure of a conventional reflective liquid crystal display device.
Figure 2:
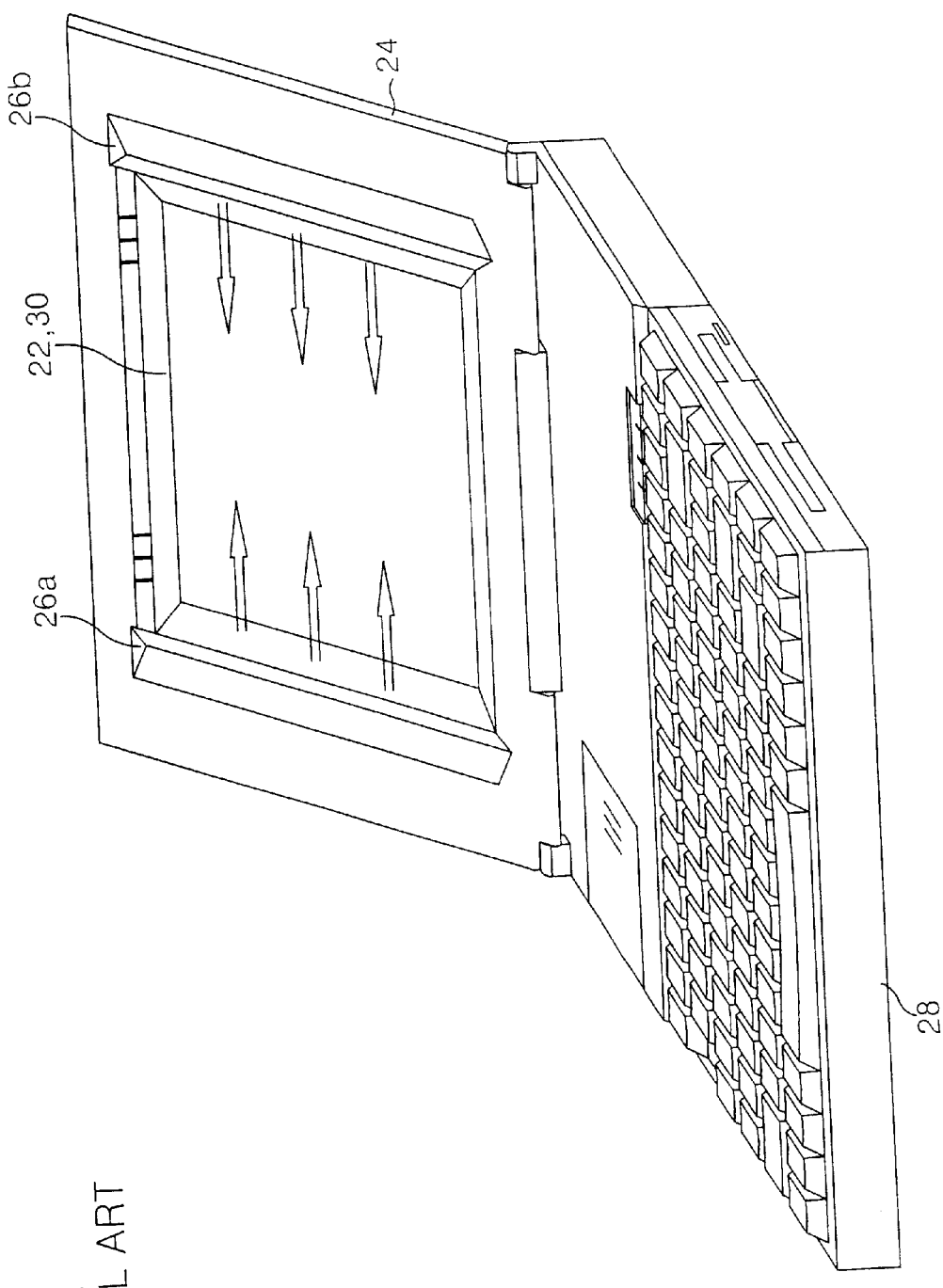
FIG. 2 is a perspective view showing a structure of a conventional reflective liquid crystal display device mounted with auxiliary light sources.
Figure 3:
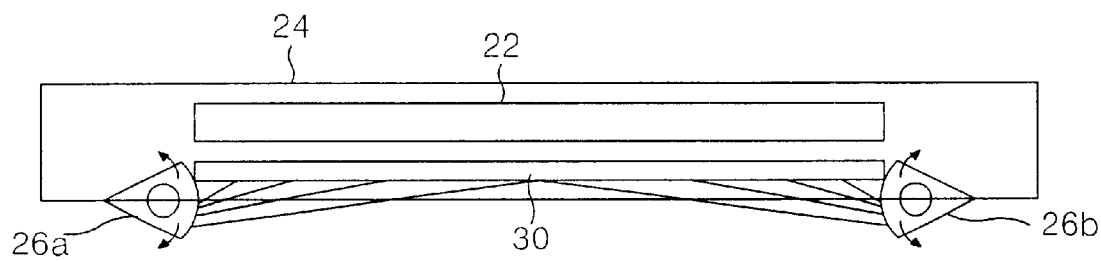
FIG. 3 is a section view of the reflective liquid crystal display panel and the film shown in FIG. 2.
Figure 4:
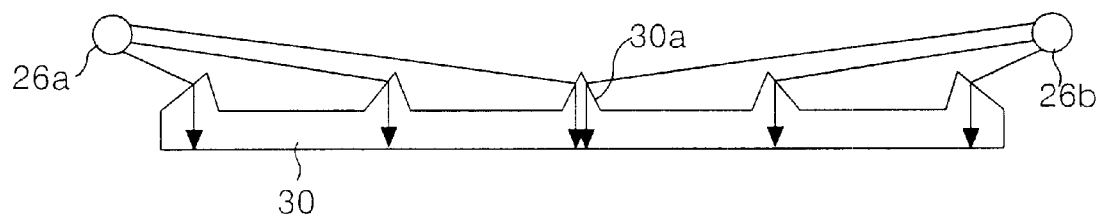
FIG. 4 illustrates a light path of an incident light controlled by the film shown in FIG. 3.
Figure 5:
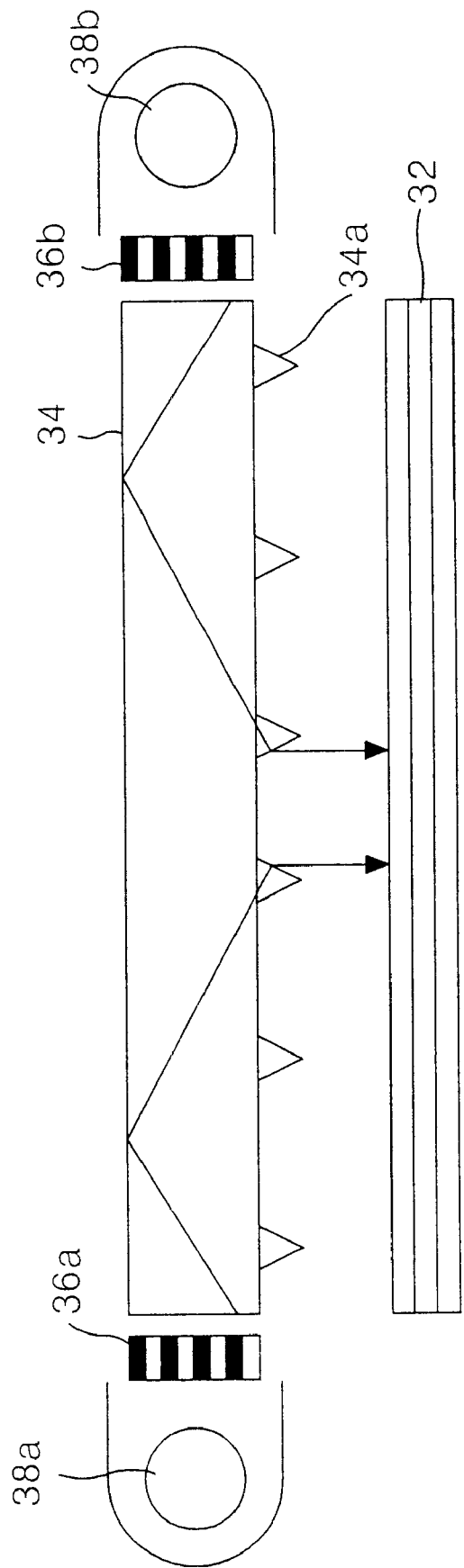
FIG. 5 is a section view showing a structure of a conventional reflective liquid crystal display device mounted with another auxiliary light sources.
Figure 6:
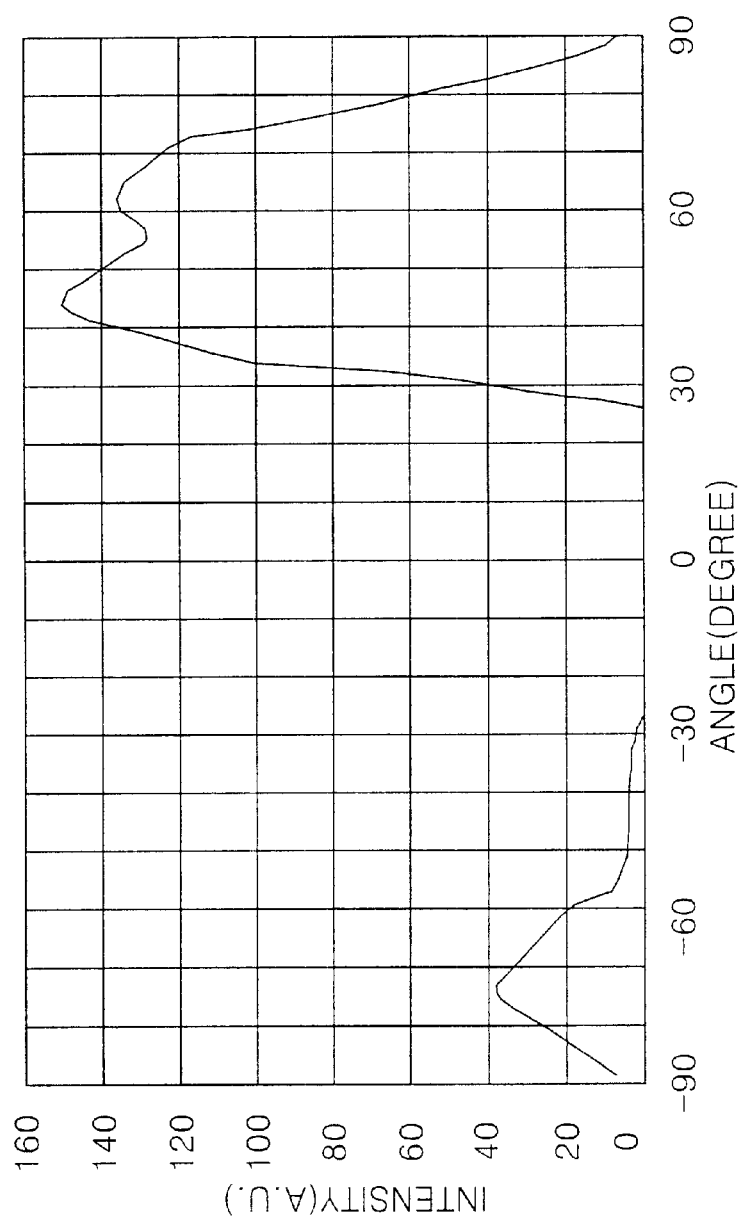
FIG. 6 is a characteristic graph of an output light quantity according to an angle variation in a light outputted from the light guide shown in FIG. 5.
Figure 15:
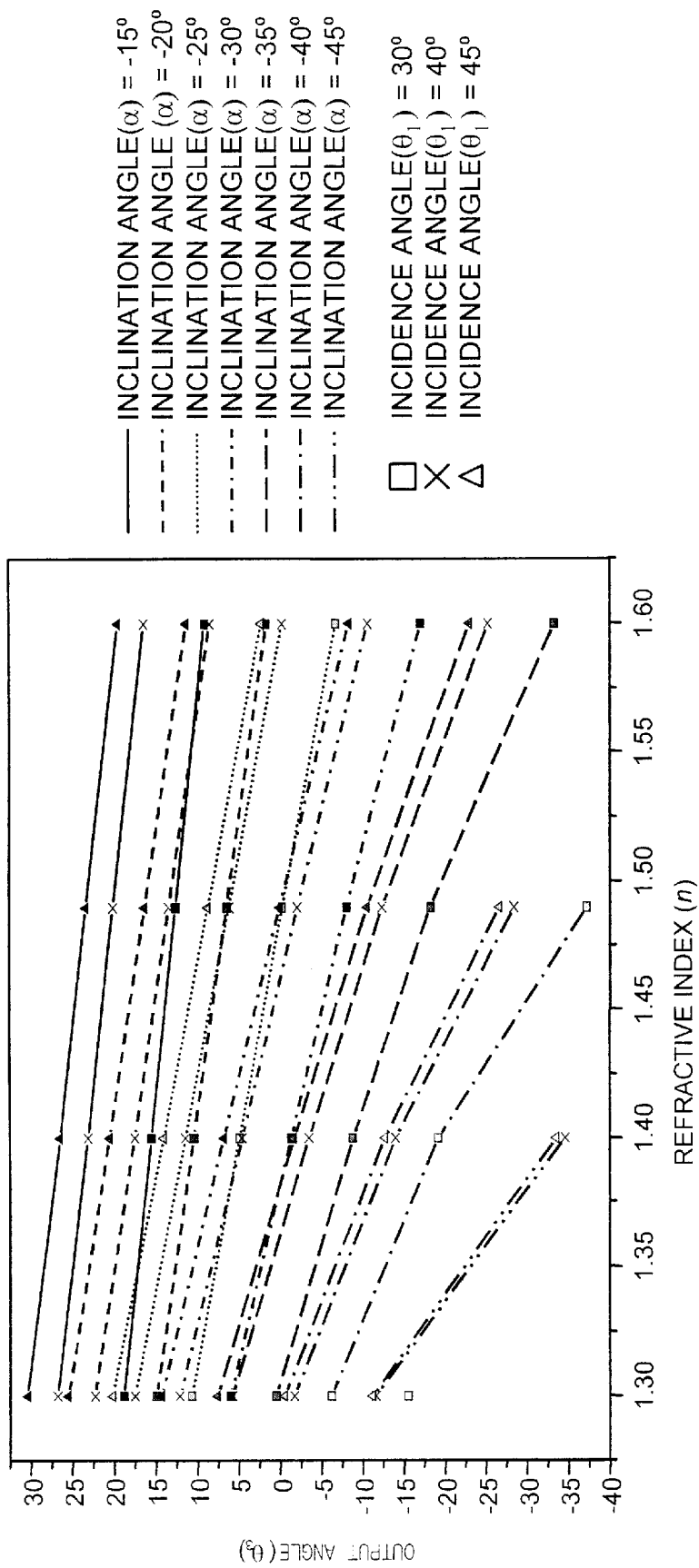
FIG. 15 is a characteristic graph representing a change in a relationship of an output angle to the same incidence angle according to refractive indices of optical media having a different inclination angle.

FIG. 15 is a graph representing a change in an output angle $\theta_3$ against the same incidence angle $\theta_1$ when a refractive index n of the light-refracting film 54 or 64 at which an inclination angle α of the first inclined face 91 is different becomes different. In FIG. 1S, the horizontal axis represents a refractive index n of the light-refracting film 54 or 64 changing from 1.30 until 1.60, and the vertical axis represents an output angle $\theta_3$ changing in accordance with a variation in the refractive index n.

As described above, according to the present invention, an optical medium for controlling an incidence angle of a light being incident to the reflective liquid crystal display panel and an output angle of a light reflected from the reflective liquid crystal display panel to be progressed toward an observer is installed between the peripheral light source or the auxiliary light source and the reflective liquid crystal display panel and the upper surface of the optical medium is provided with minute protrusion patterns each having an inclined surface, thereby allowing an incident light to be vertically incident to the reflective liquid crystal display panel and allowing an output light reflected from the reflective liquid crystal display panel to be progressed within an effective visible range of an observer. Accordingly, it is possible to maximize a light efficiency of the reflective liquid crystal display at which a light is obliquely inputted from the peripheral light source or the auxiliary light source.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A reflective display device, comprising:

reflective display means for displaying an image; and an optical medium having an inclined surface for refracting an incident light and refracting a light reflected from the reflective display means such that an obliquely inputted external light is vertically incident to the reflective display means.

2. The reflective display device according to claim 1, wherein an inclination angle of the inclined surface of said optical medium is in a range of −15° to −40°.

3. A reflective display device, comprising:

a reflective display means for displaying an image; and an optical medium having an inclined surface for refracting an incident light and refracting a light reflected from the reflective display means such that an obliquely inputted external light is vertically incident to the reflective display means, and an inclination angle of the inclined surface of said optical medium is in a range of −15° C. to −40° C., wherein said external light having an incidence angle of 0° to 45° is refracted at an angle between −15° and +15° by the inclined surface to be incident to the reflective display means; and said reflective light reflected from the reflective display means is refracted at an angle between −15° and +15° by the inclined surface to be progressed toward an observer.

4. The reflective display device according to claim 1, wherein, when the optical medium has a different refractive index, an inclination angle of the inclined surface is set to a different value.

5. A reflective display device, comprising:

a reflective display means for displaying an image; and an optical medium having an inclined surface for refracting an incident light and refracting a light reflected from the reflective display means such that an obliquely inputted external light is vertically incident to the reflective display means, and when the optical medium has a different refractive index, an inclination angle of the inclined surface is set to a different value, wherein said inclination angle of the inclined surface according to said refractive index of the optical medium satisfies the following relationships:

$30° \leq \alpha \leq 40°$ when n=1.3,
   $25° \leq \alpha \leq 35°$ when n=1.4,
   $25° \leq \alpha \leq 30°$ when n=1.5, and
   $20° \leq \alpha \leq 25°$ when n=1.6, wherein n represents the refractive index of the optical medium and $\alpha$ is the inclination angle of the inclined surface.

6. The reflective display device according to claim 1, wherein the optical medium includes:

a plane being adjacent to the inclined surface; and a second inclined surface for linking the inclined surface with the plane.

7. The reflective display device according to claim 6, wherein a pattern consisting of the inclined surface, the plane and the second inclined surface is formed on the surface of the optical medium in a rough shape, in a wavelike shape or in an irregular line shape.

8. The reflective display device according to claim 6, wherein a pattern consisting of the inclined surface, the plane and the second inclined surface is formed on the surface of the optical medium in such a manner to make an angle of 0° to 8° rather than being parallel to an electrode line pattern of a reflective liquid crystal display panel.

9. The reflective display device according to claim 1, which further comprises:

a light guide to irradiate light onto the optical medium, and a lamp supplying light to the light guide.

10. The reflective display device according to claim 3, which further comprises:

a light guide to irradiate light onto the optical medium, and a lamp supplying light to the light guide.

11. The reflective display device according to claim 5, which further comprises:

a light guide to irradiate light onto the optical medium, and a lamp supplying light to the light guide.

* * * * *